(12) United States Patent
Haino et al.

(10) Patent No.: US 11,276,906 B2
(45) Date of Patent: Mar. 15, 2022

(54) BATTERY MODULE

(71) Applicant: SANYO Electric Co., Ltd., Daito (JP)

(72) Inventors: Masami Haino, Hyogo (JP); Koichi Muramatsu, Osaka (JP); Kouji Fukushima, Fukuoka (JP)

(73) Assignee: SANYO Electric Co., Ltd., Daito (JP)

( * ) Notice: Subject to any disclaimer, the term of this patent is extended or adjusted under 35 U.S.C. 154(b) by 21 days.

(21) Appl. No.: 16/633,019

(22) PCT Filed: Jul. 23, 2018

(86) PCT No.: PCT/JP2018/027415
§ 371 (c)(1),
(2) Date: Jan. 22, 2020

(87) PCT Pub. No.: WO2019/021980
PCT Pub. Date: Jan. 31, 2019

(65) Prior Publication Data
US 2020/0220147 A1 Jul. 9, 2020

(30) Foreign Application Priority Data

Jul. 26, 2017 (JP) .............................. JP2017-144774

(51) Int. Cl.
| H01M 2/26 | (2006.01) |
| H01M 2/04 | (2006.01) |
| H01M 2/10 | (2006.01) |
| H01M 2/34 | (2006.01) |
| H01M 50/54 | (2021.01) |
| H01M 50/20 | (2021.01) |

(Continued)

(52) U.S. Cl.
CPC ......... *H01M 50/54* (2021.01); *H01M 50/166* (2021.01); *H01M 50/20* (2021.01); *H01M 50/578* (2021.01)

(58) Field of Classification Search
CPC combination set(s) only.
See application file for complete search history.

(56) References Cited

FOREIGN PATENT DOCUMENTS

| EP | 2999026 A1 | 3/2016 |
| JP | 2006-196277 A | 7/2006 |
| JP | 2008-251471 A | 10/2008 |

(Continued)

OTHER PUBLICATIONS

International Search Report dated Aug. 28, 2018, issued in counterpart application No. PCT/JP2018/027415, with English translation. (3 pages).

*Primary Examiner* — Amanda J Barrow
(74) *Attorney, Agent, or Firm* — Westerman, Hattori, Daniels & Adrian, LLP

(57) ABSTRACT

The battery module has a structure in which a plurality of batteries are arranged at fixed positions by a battery holder, a lead plate is connected to a projecting electrode of each of the batteries, a potting resin is thermally coupled to the lead plate, the battery holder includes an outer peripheral cover having an electrode window to expose the projecting electrode, the lead plate has a connection recess that is locally formed in a planar part to let a protrusion face protrude toward the projecting electrode through the electrode window, and a sealing label is put into intimate contact with the planar part of the lead plate to close an opening of the connection recess. This structure prevents the potting resin from flowing into an outlet formed in the projecting electrode.

5 Claims, 8 Drawing Sheets

(51) Int. Cl.
    *H01M 50/166*    (2021.01)
    *H01M 50/578*    (2021.01)

(56) References Cited

FOREIGN PATENT DOCUMENTS

| | | |
|---|---|---|
| JP | 2012-015121 A | 1/2012 |
| JP | 2012-054121 A | 3/2012 |
| JP | 2014-241296 A | 12/2014 |
| WO | 2014/184993 A1 | 11/2014 |
| WO | 2016/178315 A1 | 11/2016 |

BATTERY MODULE

TECHNICAL FIELD

The present invention relates to a battery module in which a projecting electrode side of a battery is thermally coupled to a potting resin, and particularly to a battery module including a discharge valve disposed on a projecting electrode side of a battery.

BACKGROUND ART

A battery module in which a projecting electrode side of a battery is thermally coupled to a potting resin has been developed (see PTL 1).

A battery module having this structure allows adjacent batteries to be thermally coupled to each other through a potting resin and thus is characterized by being able to reduce unevenness in temperatures of the batteries arranged at fixed positions. Each of the batteries with an outlet of a discharge valve formed in a projecting electrode is required to prevent the potting resin from flowing inside through the outlet when an end of the battery is buried under the potting resin. This is because the potting resin that has flowed inside hinders proper operation of the discharge valve. To prevent the inflow of the resin, the inventors of the present invention developed, as shown in an enlarged cross-sectional view of FIG. 7, a structure in which sealing label 106 is stuck on projecting electrode 111 of battery 101 and an end of the battery is buried under a potting resin. A battery module in this drawing includes ring-shaped sealing label 106 that breaks by an exhaust gas and that is stuck on an end face of the battery adjacent to projecting electrode 111. A center of sealing label 106 has attachment hole 107 that is opened to expose a middle of projecting electrode 111, and an outer peripheral part of the sealing label is stuck on an outer peripheral part of sealing plate 112. Sealing label 106 is stuck on both an outer peripheral part of projecting electrode 111 and the outer peripheral part of sealing plate 112 and covers outlet 113 formed in an upright part of projecting electrode 111 to prevent inflow of the potting resin through outlet 113.

CITATION LIST

Patent Literature

PTL 1: Unexamined Japanese Patent Publication No. 2008-251471

SUMMARY OF THE INVENTION

However, the battery module shown in FIG. 7, because of difficulty in connecting lead plate 103 used to connect a battery to an adjacent battery in series or in parallel, has a disadvantage of not allowing stable and reliable connection of lead plate 103 to projecting electrode 111. This is because ring-shaped sealing label 106 stuck on the outer peripheral part of projecting electrode 111 narrows an exposed area of the projecting electrode. Lead plate 103, a metal sheet, is connected to exposed face 111A formed on a surface of projecting electrode 111 by spot welding, laser welding, or ultrasonic welding while the lead plate is reliably in contact with the exposed face. However, while connecting part 133 of lead plate 103 is not allowed to be reliably in contact with exposed face 111A on the surface of projecting electrode 111, reliable and stable connection is not possible. In particular, spot welding has a characteristic of enabling reliable and stable connection of lead plate 103, and this method, as shown in an enlarged plan view of FIG. 8, involves pressing a pair of welding electrodes against two welding points 137 formed on either side of slit 136 to avoid reactive current and passing a current between the electrodes to weld lead plate 103. However, a failure of contact with any welding point 137 hinders stable connection. A battery commonly called "18650" that is frequently used as a cylindrical lithium ion secondary battery in a variety of applications is formed into a circular cylinder that measures 18 mm in outside diameter and 650 mm in overall length. A smaller projecting electrode is disposed on an end face of the battery with an outside diameter of 18 mm, and a lead plate is connected to the projecting electrode. Thus, if a sealing label is stuck on an outer peripheral part of the electrode and an exposed area of the electrode gets even smaller, connecting the lead plate is very difficult and stable and reliable connection in particular is substantially difficult. This causes the battery module to have a lowered yield and causes the product to offer decreased stability.

The present invention has been accomplished to solve the above problem. It is an object of the present invention to provide a battery module that allows a lead plate to be stably and reliably connected to a projecting electrode while preventing inflow of a potting resin through an outlet formed in the projecting electrode.

A battery module according to an aspect of the present invention includes a plurality of batteries each including an outlet of a discharge valve disposed in a projecting electrode on an end face of each of the plurality of batteries, a battery holder arranging the batteries parallel to each other at fixed positions, a lead plate connected to the projecting electrode of each of the batteries that are arranged at the fixed positions by the battery holder, the end face of each of the batteries being disposed on a same plane, and potting resin thermally coupled to the lead plate. The discharge valve is configured to open when an internal pressure of each of the batteries rises to a set pressure. The battery holder includes an outer peripheral cover having an electrode window to expose the projecting electrode and being disposed on a plane facing an outer peripheral edge of the projecting electrode. The lead plate includes a planar part disposed over a surface of the outer peripheral cover and a connection recess disposed in the planar part. The connection recess is guided into the electrode window in the battery holder and protrudes toward the projecting electrode to connect a protrusion face to the projecting electrode. In the battery module, a first double-sided tape provides a tight fit between an outer peripheral part of each of the batteries and the outer peripheral cover of the battery holder to ensure that the outer peripheral part of each of the battery fits tightly over the outer peripheral cover. A second double-sided tape provides a tight fit between the outer peripheral cover of the battery holder and the planar part of the lead plate to ensure that the outer peripheral cover fits tightly over the planar part of the lead plate. A sealing label is put into intimate contact with the planar part of the lead plate to ensure that the sealing label closes an opening of the connection recess of the lead plate. The first double-sided tape, the second double-sided tape, and the sealing label constitute a structure that prevents the potting resin from flowing into the outlet disposed in the projecting electrode of each of the batteries.

The battery module described above is characterized by allowing the lead plate to be stably and reliably connected to the projecting electrode while preventing the potting resin from flowing inside through the outlet formed in the projecting electrode. This is because the battery module is able to prevent inflow of the potting resin through the outlet without a sealing label stuck on a surface of the projecting electrode. In the battery module, as shown in enlarged principal part sectional views of FIGS. 1 and 2, the sealing label 6 is not stuck on the projecting electrode 11 but is stuck on a surface of the lead plate 3 connected to the projecting electrode 11. In addition to the sealing label 6, the battery module includes the first double-sided tape 4 and the second double-sided tape 5 stuck on both sides of the outer peripheral cover 21 of the battery holder 2 to prevent the potting resin 13 from flowing through any gap between an outer peripheral edge of each of the batteries 1 and the outer peripheral cover 21 of the lead plate 3.

Thus, unlike the conventional battery module, the battery module described above is without the sealing label stuck on the projecting electrode and is able to prevent the potting resin from flowing inside through the outlet formed in the projecting electrode by means of the sealing label and the double-sided tape. In particular, the battery module described above eliminates the need for precisely sticking a sealing label on an outer peripheral edge of a small projecting electrode. This makes a process of sticking a sealing label simple and effortless and enables efficient mass production of the battery module. The battery module allows the lead plate to be connected to a fully exposed surface of the projecting electrode and hence contributes to reliable and stable connection of the lead plate. Further, the lead plate is stuck to the battery holder through the double-sided tape, and the battery holder is stuck to the end face of the electrode of the battery through the double-sided tape. This configuration allows the lead plate to be connected to the projecting electrode while the lead plate is temporarily fixed through the double-sided tape to avoid misalignment. This also allows the lead plate to be connected to the projecting electrode with increased reliability and stability.

In a battery module according to another aspect of the present invention, the batteries may be cylindrical batteries.

In a battery module according to another aspect of the present invention, the sealing label may have an external shape that covers a series of a plurality of connection recesses being adjacent to each other and being connected to a plurality of projecting electrodes.

The configuration described above enables a single sheet of the sealing label to close a series of the plurality of the connection recesses adjacent to each other. An entire area of the sealing label can be widened to cover an area including the plurality of the connection recesses and close the connection recesses, and an adhesive layer can also be disposed on an area between the connection recesses adjacent to each other. This enables the sealing label to display increased adhesive strength for the lead plate and reliably close the connection recesses. A single sheet of the sealing label closes the plurality of the connection recesses. This helps to reduce time required for manufacturing as well as manufacturing costs.

In a battery module according to another aspect of the present invention, first double-sided tape may have a ring shape and may have an inside diameter substantially equal to an inside diameter of the electrode window and an outside diameter substantially equal to an outside diameter of the battery.

The configuration described above enables the first double-sided tape with a widened area to be put into intimate contact with the outer peripheral part of each of the batteries and the outer peripheral cover of the battery holder and provide reliable sealing. This configuration also enables an entire surface of the projecting electrode of the battery to be reliably exposed out of the electrode window.

In a battery module according to another aspect of the present invention, the second double-sided tape may have an external shape substantially identical to an external shape of the lead plate, cover an area including a plurality of the electrode windows opened in the battery holder, and include through-holes that are opened at places facing the respective electrode windows so as to be similar in outline to the electrode windows. The plurality of connection recesses are disposed in the respective through-holes.

The configuration described above enables the second double-sided tape with a widened area to be put into intimate contact with the planar part of the lead plate and opening edges of the plurality of the electrode windows opened in the outer peripheral cover and provide reliable sealing. This configuration also enables the connection recesses that are disposed in the through-holes opened in the second double-sided tape to be reliably put into contact with the projecting electrodes exposed out of the respective electrode windows. Further, a single sheet of the second double-sided tape is put into intimate contact with the opening edges of the plurality of the electrode windows and the planar part of the lead plate. This helps to reduce time required for manufacturing as well as manufacturing costs.

BRIEF DESCRIPTION OF DRAWINGS

FIG. 5 is an exploded perspective view of the battery module shown in

FIG. 3.

DESCRIPTION OF EMBODIMENT

Figure 1:
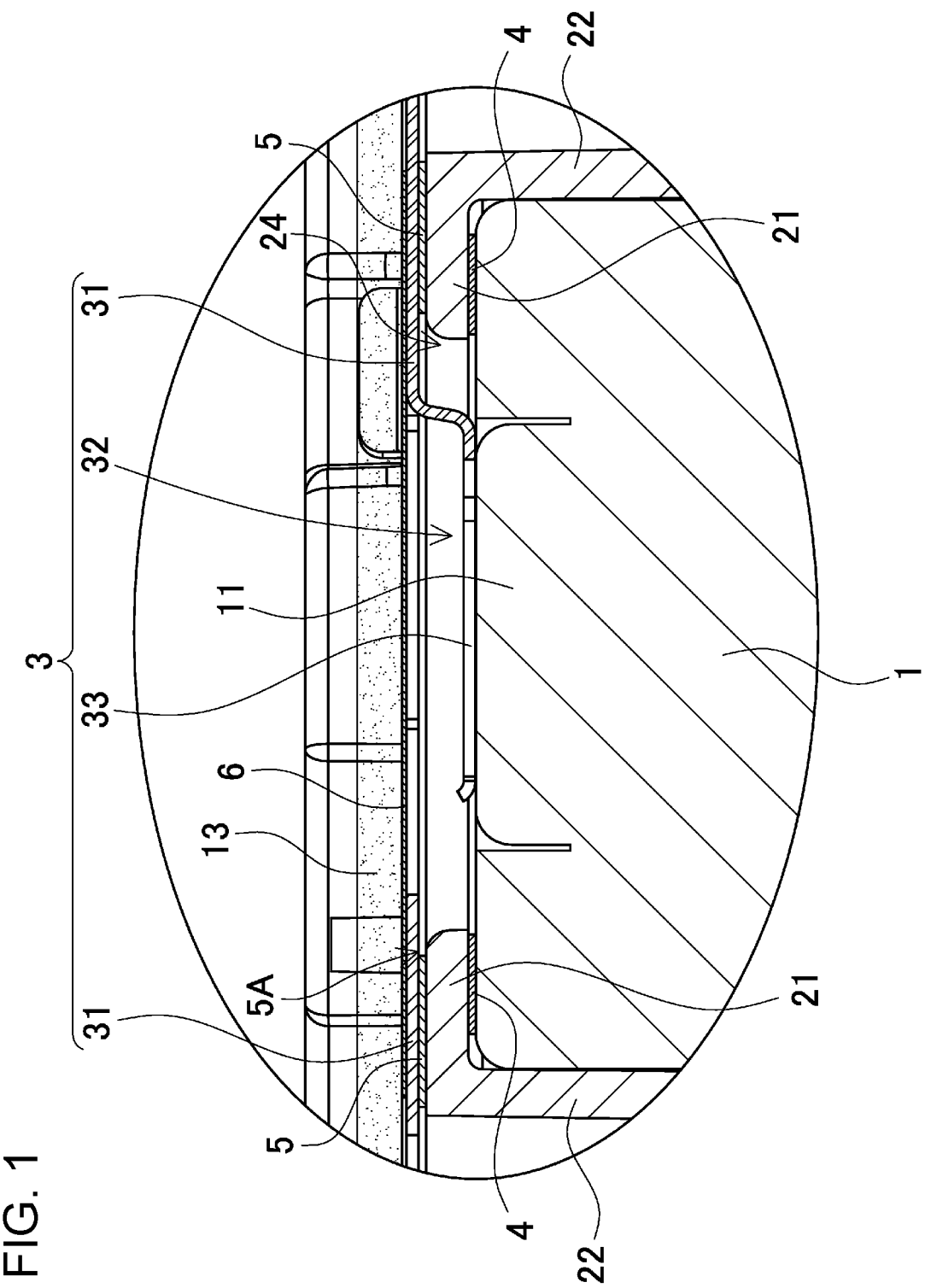
FIG. 1 is an enlarged vertical longitudinal sectional view of a principal part of a battery module according to an exemplary embodiment of the present invention, viewed along arrows I, I in FIG. 4.

Hereinafter, an exemplary embodiment of the present invention will be described with reference to the drawings. It is to be noted, however, that the exemplary embodiment described below is an illustration embodying a technical idea of the present invention, and the present invention is not specifically limited to the following exemplary embodiment. The components recited in the claims are not limited to the components described in the exemplary embodiment. In particular, it is not intended to limit the scope of the present invention to sizes, materials, shapes, relative arrangement, and the like of the components, which are described in the exemplary embodiment, unless otherwise specified. The sizes and the like are mere explanation examples. The sizes, the relative positions, and others of the members may be illustrated exaggeratedly in the drawings for clear explanation. Furthermore, in the following description, the same names or the same reference marks denote the same components or same type components, and detailed description is appropriately omitted. A single member may be configured to serve as a plurality of elements of the present invention. On the other hand, a function of a single element of the present invention may be achieved by a plurality of members. Contents described in some examples or in the exemplary embodiment can be used, for example, in other examples or exemplary embodiments. A vertical direction described in the specification is specified in the drawings.

Figure 3:
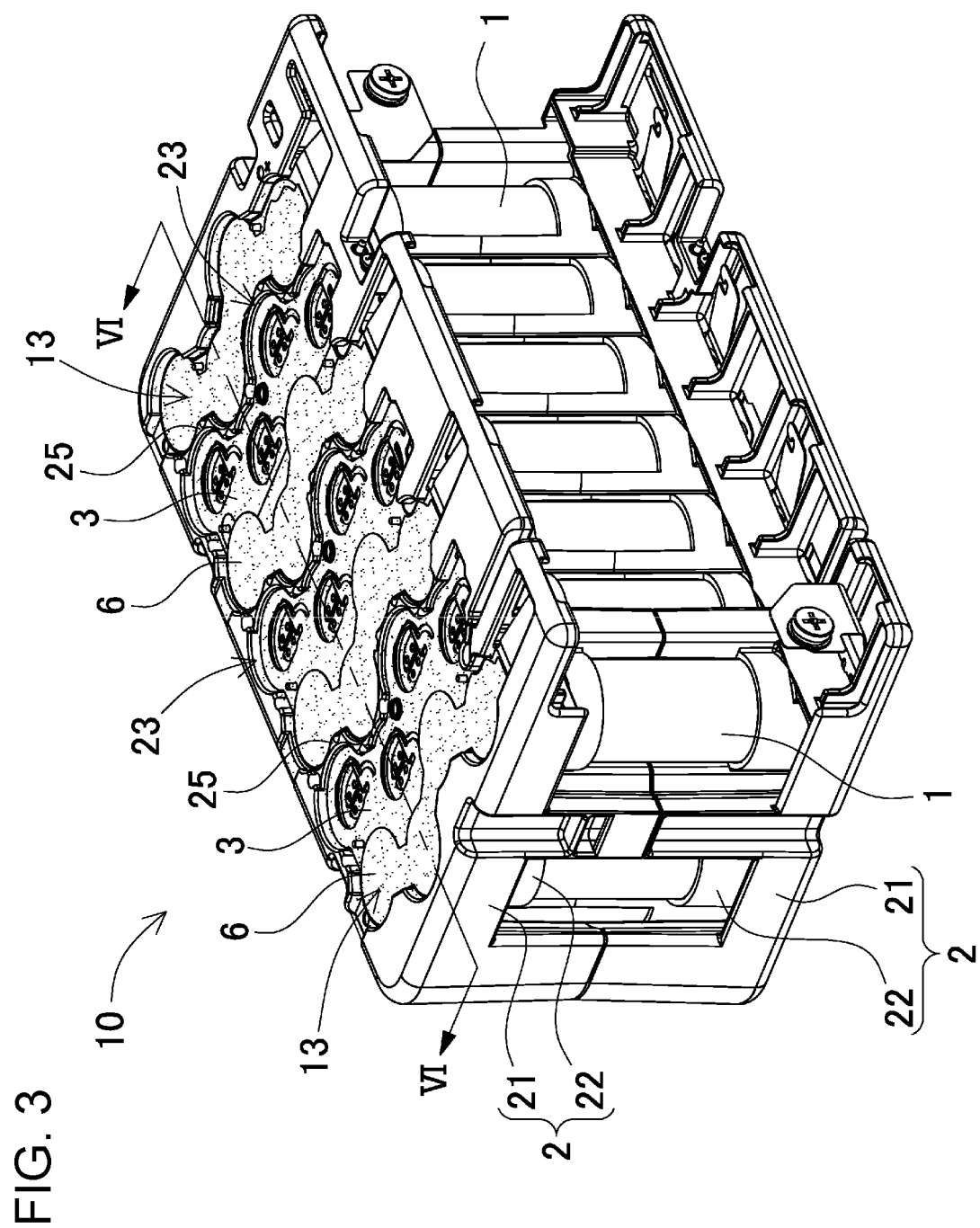
FIG. 3 is a perspective view of a battery module according to an exemplary embodiment of the present invention.
Figure 4:
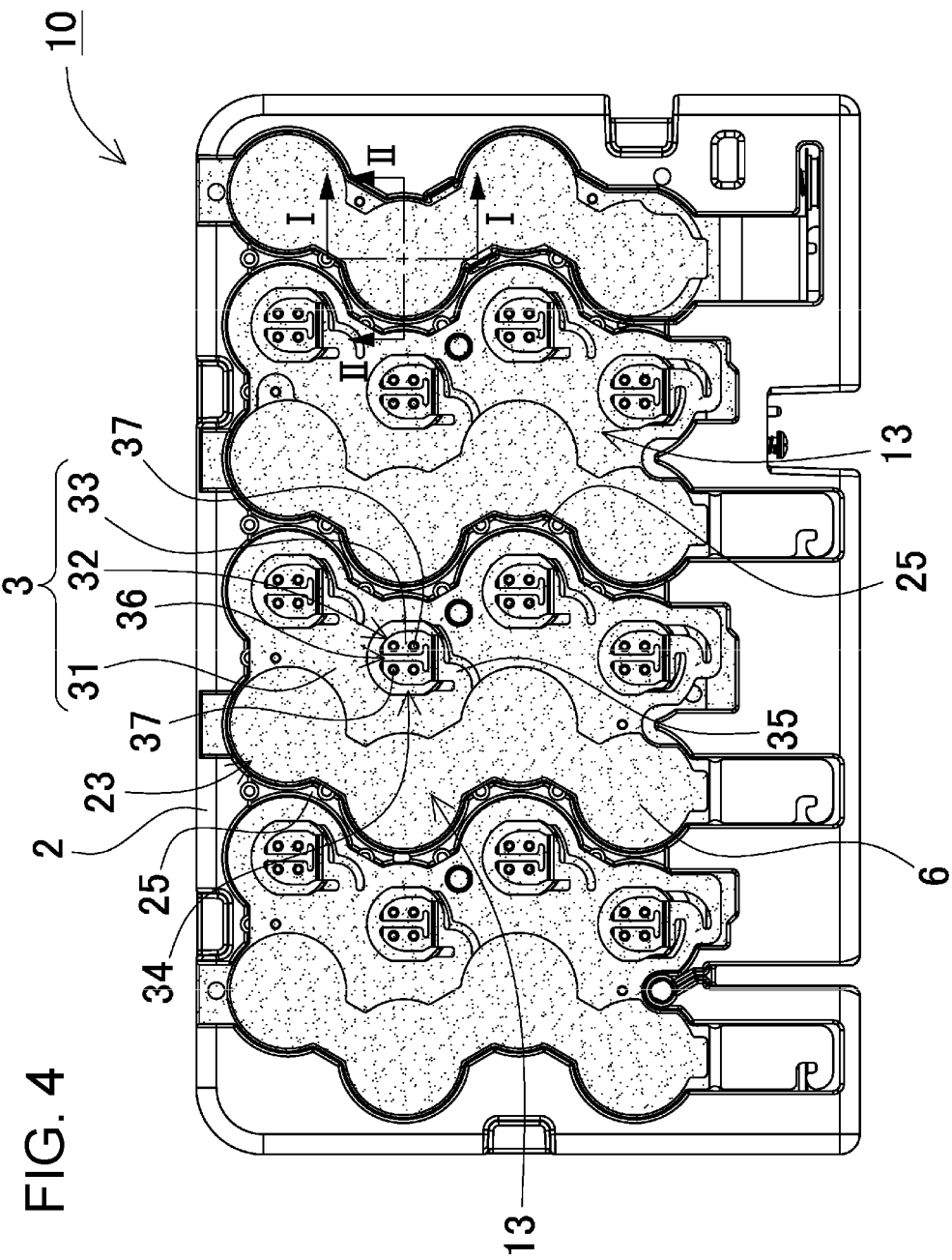
FIG. 4 is a plan view of the battery module shown in FIG. 3.
Figure 5:
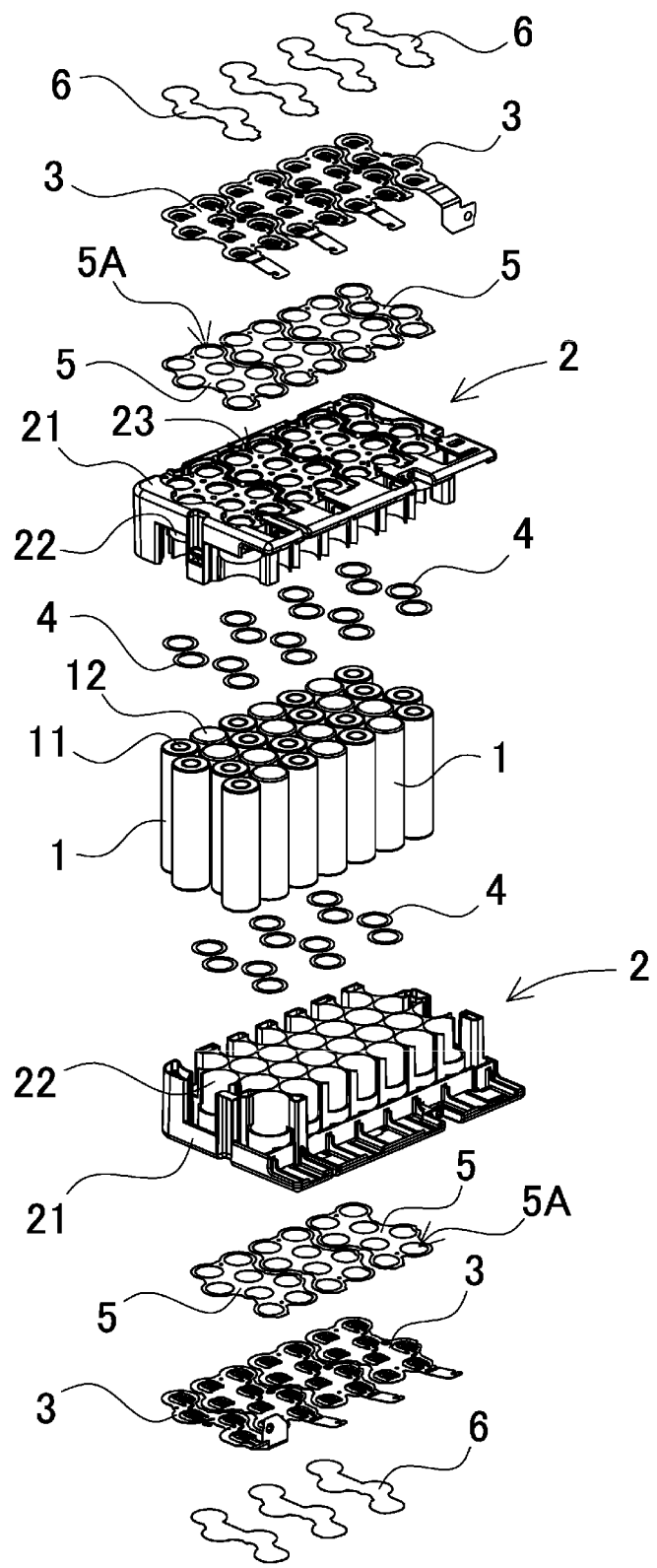

Battery module 10 shown in a perspective view of FIG. 3 and a plan view of FIG. 4, includes, as shown in an exploded perspective view of FIG. 5, a plurality of batteries 1, battery holder 2 to arrange the plurality of batteries 1 parallel to one another at fixed positions, lead plates 3 to connect electrodes of batteries 1 arranged on same planes, and potting resin 13 thermally coupled to lead plates 3. In battery module 10, the plurality of batteries 1 are arranged at fixed positions by battery holder 2, lead plates 3 are connected to both ends of batteries 1, and as shown in a vertical sectional view of FIG. 6, pieces of potting resin 13 are disposed outside lead plates 3 and thermally coupled to lead plates 3 and the ends of batteries 1.

Battery module 10 further includes first double-sided tape 4, second double-sided tape 5, and sealing labels 6 to prevent liquid or pasty potting resin 13 from permeating inside through an outlet of a discharge valve formed in projecting electrode 11 of each battery 1 while being filled with potting resin 13.

(Battery 1)

Battery 1 has positive and negative electrodes on both ends. One of the electrodes constitutes projecting electrode 11 formed on a sealing plate and the other end is plane electrode 12 formed on a bottom of an exterior can. Battery 1 is a cylindrical lithium ion secondary battery provided with an outlet formed in projecting electrode 11. The lithium ion secondary battery has a large capacity relative to its size and weight and enables battery module 10 to have an increased overall capacity. However, batteries 1 for the battery module of the present invention are not limited to lithium ion secondary batteries. Batteries 1 may be, for example, nickel metal hydride batteries, nickel-cadmium batteries, or other rechargeable batteries. In battery module 10 shown in the drawings, batteries 1 are cylindrical batteries. The batteries may, however, be prismatic batteries. Lead plates 3 are welded to projecting electrodes 11 on both ends of batteries 1 by spot welding or another technique to connect adjacent batteries 1 in series or in parallel.

Battery 1 has a discharge valve (not shown) inside the sealing plate. The discharge valve opens when an internal pressure of battery 1 gets higher than a set pressure and thereby prevents a case of the battery from rupturing. The opened discharge valve discharges an exhaust gas outside to prevent the internal pressure from rising. The sealing plate has an outlet on a periphery of projecting electrode 11 to discharge the exhaust gas from the opened discharge valve. When the internal pressure of battery 1 gets higher than the set pressure, battery 1 lets the discharge valve open to discharge an exhaust gas outside through the outlet formed on the periphery of projecting electrode 11 and prevent a rupture caused by a rise in the internal pressure.

(Battery Holder 2)

Battery holder 2 arranges batteries 1 parallel to one another at fixed positions such that end faces of the batteries where projecting electrodes 11 and plane electrodes 12 exist are arranged on respective same planes. Battery holder 2 is made by molding an insulating material such as a plastic. Battery holder 2 shown in FIGS. 3 and 4 includes a pair of outer peripheral covers 21 to cover both end surfaces of batteries 1, both end faces of which are arranged on the respective same planes, and insertion parts 22 that batteries 1 are inserted into and are thereby arranged at fixed positions. Each of the outer peripheral covers and the corresponding insertion parts are integrally molded. Battery holder 2 arranges batteries 1 at fixed positions such that all the batteries are parallel to one another. Lead plates 3 are welded to and connected to both ends of batteries 1. To make sure that planar lead plates 3 are connected to the end faces of batteries 1, battery holder 2 allows batteries 1 to be inserted into insertion parts 22 and be arranged at specified positions such that both ends of the batteries are substantially flush with respective same level surfaces.

Battery holder 2 shown in the exploded perspective view of FIG. 5 is divided into two members on both sides of batteries 1 (divisible into two of upper and lower members in FIG. 5) and is molded from a plastic. Further, battery holder 2 shown in FIGS. 3 and 4 has filling room 23 in a surface of each outer peripheral cover 21 covering batteries 1. The filling room is filled with potting resin 13. In FIG. 5, filling room 23 is formed in an upper surface of the member of battery holder 2 disposed on an upper side, and filling room 23 is formed in a lower surface of the member of battery holder 2 disposed on a lower side.

Battery holder 2 has insertion parts 22, which batteries 1 are inserted into and are arranged at fixed positions. In battery module 10 shown in the drawings, batteries 1 are cylindrical batteries, and hence insertion parts 22 are each cylindrical. An inside diameter of cylindrical insertion part 22 is slightly larger than an outside diameter of battery 1 to enable smooth insertion of battery 1. While the battery is being inserted into the insertion part, a tiny gap is left between a surface of battery 1 and an inner surface of insertion part 22. Battery holder 2 may have insertion parts 22 that are formed inside cylindrical shapes molded from a plastic or may have insertion parts 22 by molding a plastic into a block and making cylindrical through-holes inside the block. Battery holder 2 including the insertion parts molded from a plastic into cylindrical shapes arranges batteries 1 at fixed positions by allowing the batteries to be inserted into cylindrical insertion parts 22. This battery holder 2 is able to effectively prevent thermal runaway because adjacent batteries 1 are inserted into separately molded insertion parts 22. Battery holder 2 that allows batteries 1 to be inserted into through-hole insertion parts 22 has a large heat capacity and is thus able to absorb heat from battery 1 to prevent a rise in temperature of battery 1 and make a temperature difference between adjacent batteries 1 smaller.

Battery holder 2 has outer peripheral covers 21 on both ends of pairs of insertion parts 22. The outer peripheral covers have electrode windows 24 through which the ends of batteries 1 are exposed and connected to lead plates 3. Electrode windows 24 each expose the end face of battery 1 inserted into insertion part 22 to an outside, i.e., a bottom of filling room 23, out of insertion part 22. Lead plates 3 are welded to the electrodes on both ends of each battery 1 exposed to filling rooms 23 through respective electrode windows 24. Lead plates 3 welded to the electrodes are disposed at the bottoms of respective filling rooms 23.

Figure 6:
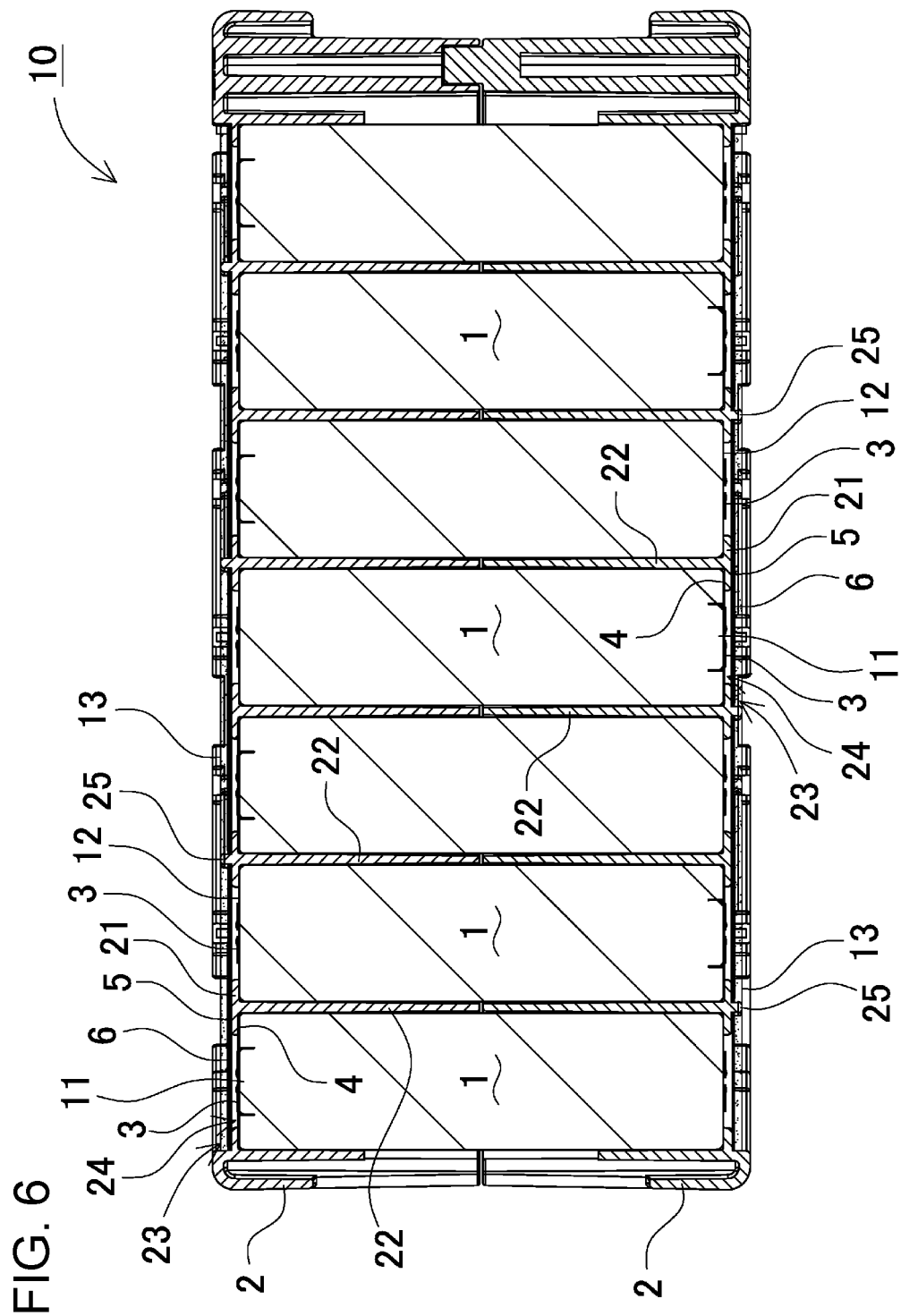
FIG. 6 is a sectional view of the battery module shown in FIG. 3, viewed along arrows VI, VI.
Figure 7:
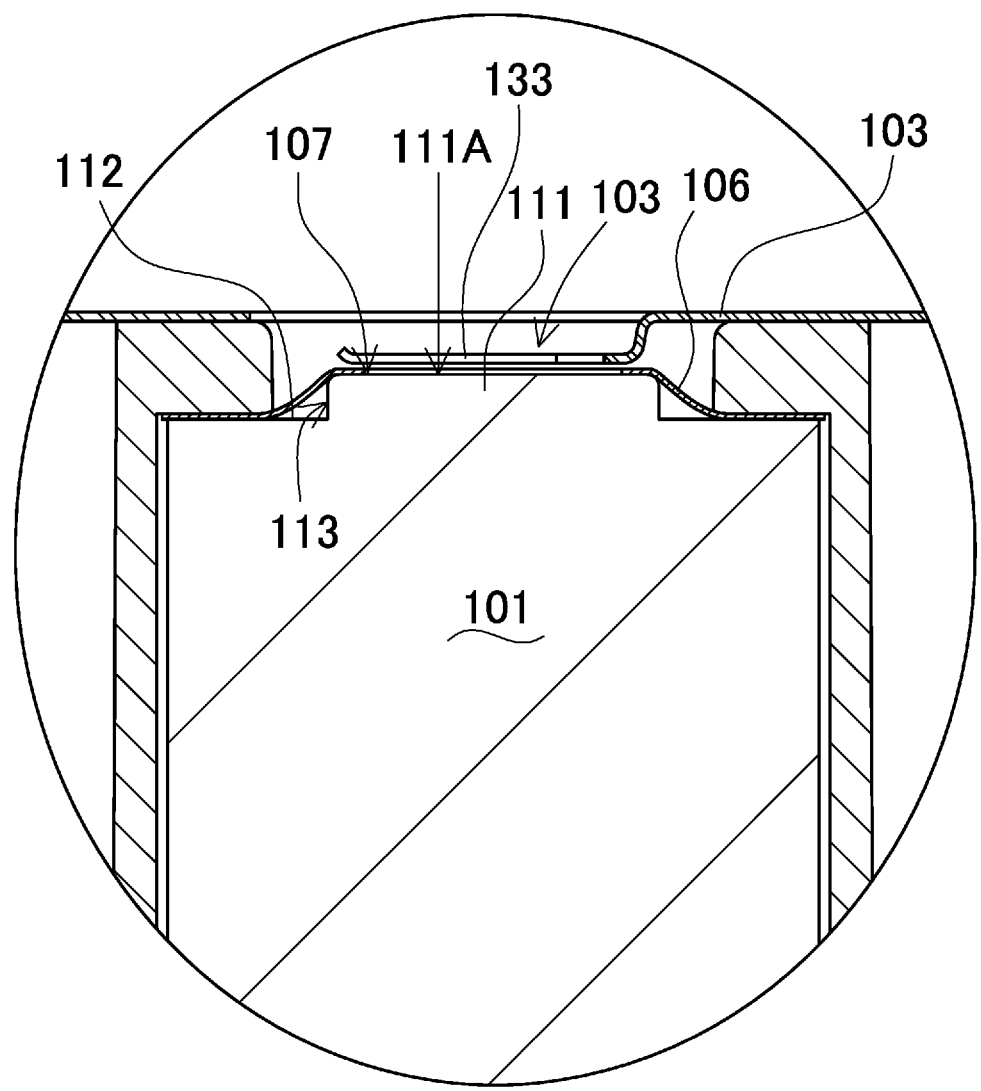
FIG. 7 is an enlarged sectional view illustrating a principal part of a coupling structure of a battery and a sealing label in a conventional battery module.
Figure 8:
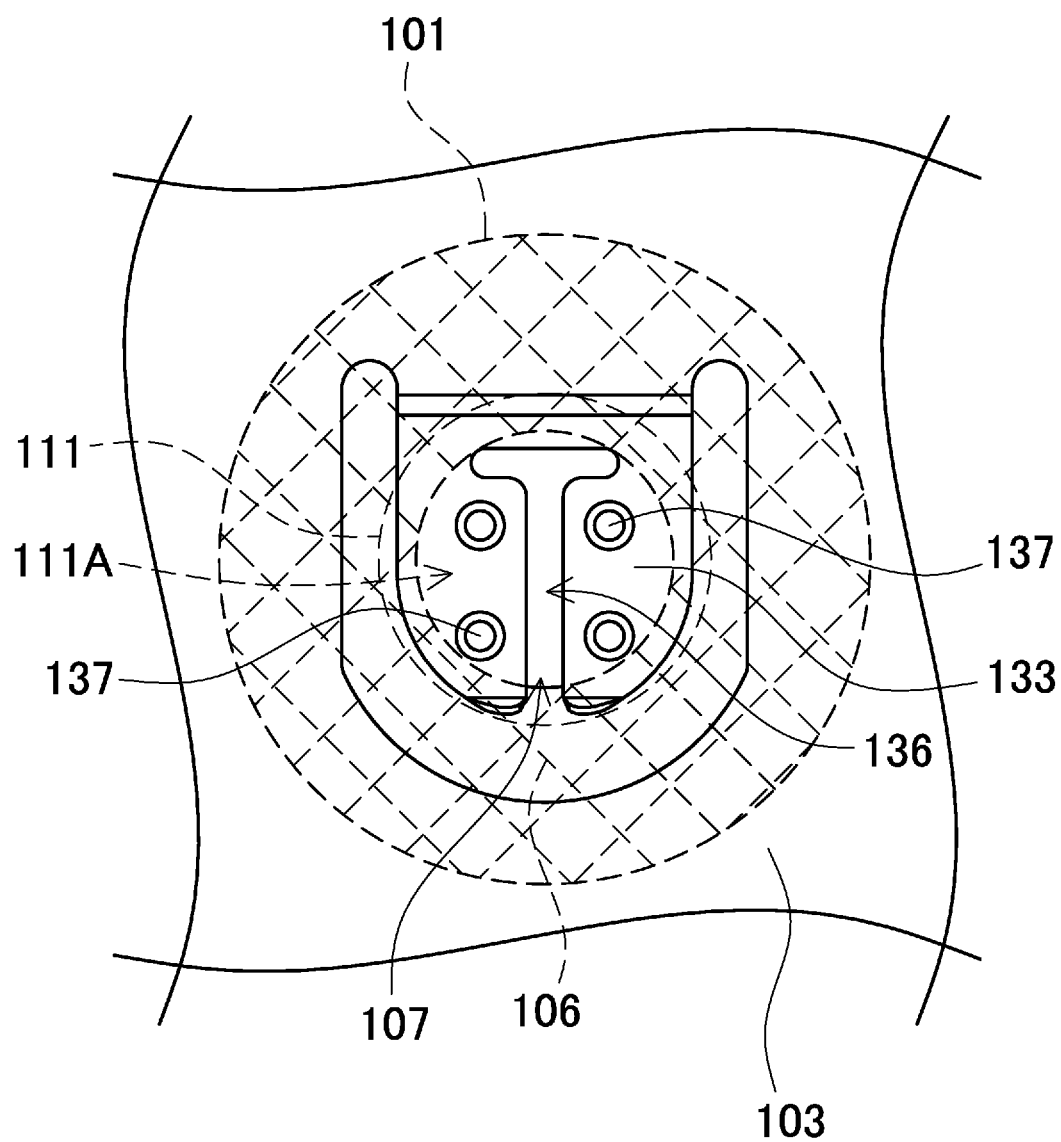
FIG. 8 is an enlarged plan view illustrating a connection structure of the battery and a lead plate shown in FIG. 7.

As shown in the sectional view of FIG. 6, to make sure that filling rooms 23 are filled with pasty potting resin 13 that has not been cured, peripheral wall 25 is formed along an outer periphery of a zone filled with potting resin 13, and the zone inside each peripheral wall 25 constitutes filling room 23. A thickness of potting resin 13 loaded into filling room 23 can be controlled by a height of peripheral wall 25. High peripheral wall 25 means that deep filling room 23 can be filled with a large amount of potting resin 13. A depth of filling room 23 ranges, for example, from about 1 mm to 10 mm so that potting resin 13 loaded into the filling room has a thickness to facilitate heat conduction and decrease temperature difference between adjacent batteries 1.

(Lead Plate 3)

Lead plates 3 are metal sheets that are connected to the ends of adjacent batteries 1 to connect batteries 1 in series or in parallel. Lead plates 3 are connected to projecting electrodes 11 and plane electrodes 12, positive and negative electrodes of batteries 1, to connect batteries 1 in series or in parallel. Lead plate 3 includes planar part 31 and connection recesses 32 formed in the planar part. Planar part 31 is disposed over a bottom surface of filling room 23 in battery holder 2, i.e., an outer surface of outer peripheral cover 21 included in battery holder 2, whereas connection recesses 32 are guided into electrode windows 24 in outer peripheral cover 21 to let protrusion faces 33 protruding toward the electrodes of batteries 1 be connected to batteries 1. Planar part 31 is present around each connection recess 32, and lead plate 3 is shaped such that openings of connection recesses 32 are closed with sealing label 6 bonded to planar part 31.

Lead plate 3 in which connection recesses 32 are formed in planar part 31 is made by cutting a planar metal sheet and bending the cut metal sheet. Since protrusion faces 33 are connected to projecting electrodes 11 and plane electrodes 12 formed on the end faces of batteries 1, connection recesses 32 are disposed at places facing projecting electrodes 11 and plane electrodes 12 of batteries 1 that are disposed at fixed positions by battery holder 2. Lead plate 3 has separation slits 34 that are each formed along an outer periphery of connection recess 32. Separation slit 34 is formed partly along the outer periphery of connection recess 32, and a part of the outer periphery where no separation slit 34 is present constitutes linking part 35. Protrusion faces 33 are linked to planar part 31 through respective linking parts 35. Linking part 35 is bend and shaped such that protrusion face 33 of connection recess 32 is inserted into electrode window 24 and is put into contact with and connected to the electrode of battery 1. Lead plate 3 having separation slit 34 between protrusion face 33 and planar part 31 puts connection recess 32 at a deep level, or in other words, lets protrusion face 33 protrude from planar part 31 to a high degree and thereby enables the protrusion face to be connected to the electrode of battery 1. However, in a battery module of the present invention, a lead plate does not necessarily have a separation slit on an outer peripheral edge of a connection recess and may let a protrusion face protrude from a planar part without a separation slit to enable the protrusion face to be connected to an electrode of a battery.

Protrusion face 33 connected to the electrode of battery 1 includes welding slit 36 extending to a side away from linking part 35 and welding points 37 disposed on both sides of welding slit 36. The welding points are designed to be pressed by positive and negative welding electrodes and be welded to the electrode of the battery. In the drawings, lead plate 3 has two welding points 37 on either side of every welding slit 36 and a welding protrusion on each welding point 37. This structure enables the lead plate to be reliably welded to the electrode of battery 1. Lead plate 3 is shaped such that, when the lead plate is set in filling room 23 in battery holder 2, connection recesses 32 are guided into electrode windows 24 and the welding protrusions are put into contact with projecting electrodes 11 and plane electrodes 12 of batteries 1. However, even if the welding protrusions are not put into contact with the electrodes of batteries 1 when lead plate 3 is set in filling room 23, the welding protrusions can be pressed by positive and negative welding electrodes so as to be put into contact with and be connected to the electrodes of batteries 1. This configuration allows protrusion faces 33 to be reliably and stably connected to the electrodes of batteries 1 by spot welding. The present invention, however, is not intended to limit a way of connecting protrusion faces 33 to the electrodes of batteries 1 to spot welding. This is because the protrusion faces can be connected to the electrodes of the batteries by laser welding or ultrasonic welding. A process of connecting protrusion faces 33 to the electrodes of batteries 1 by laser welding involves pressing protrusion faces 33 to put the protrusion faces into contact with the electrodes of batteries 1 while the welding points are irradiated with laser beams.

Figure 2:
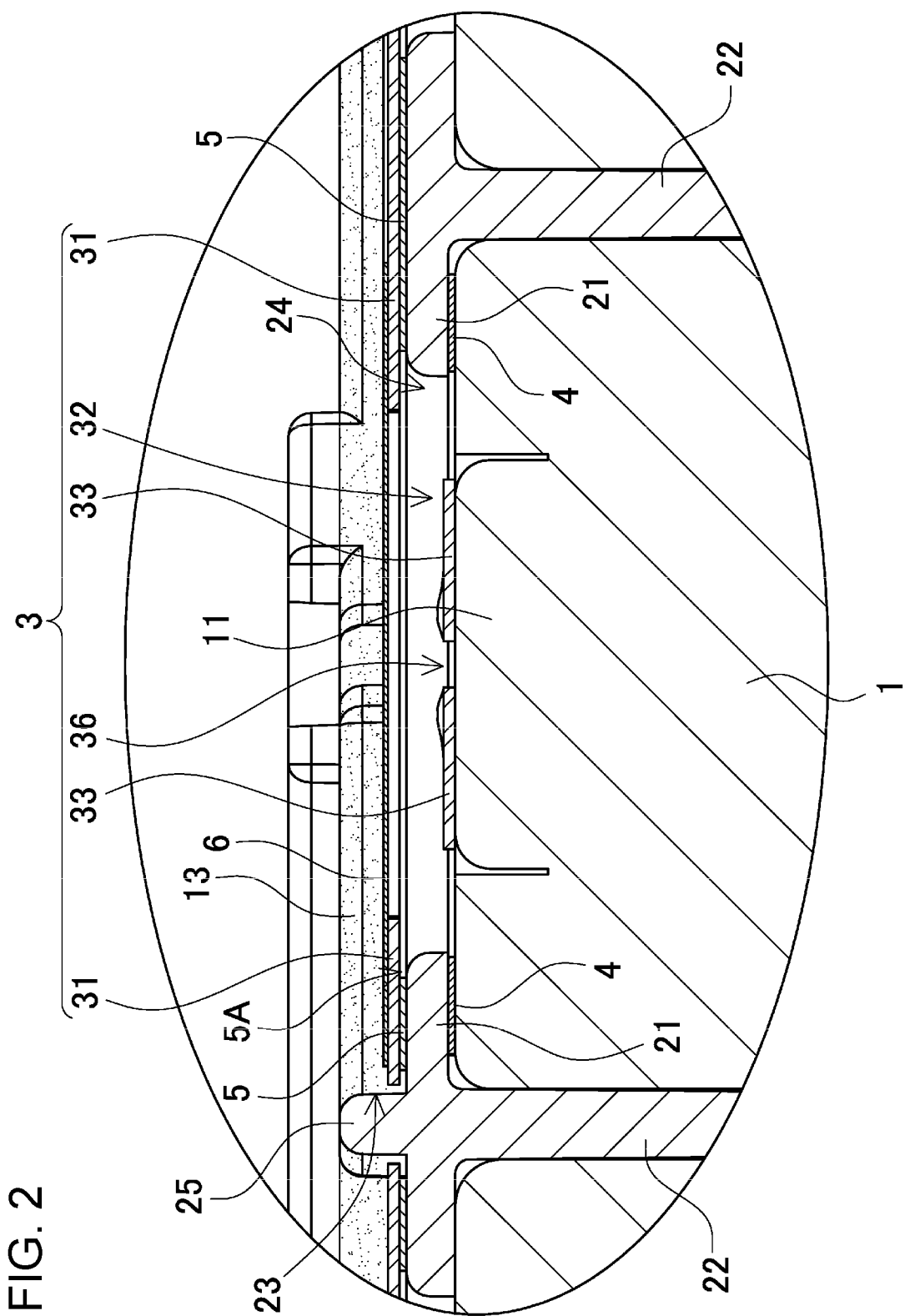
FIG. 2 is an enlarged vertical transverse sectional view of a principal part of a battery module according to an exemplary embodiment of the present invention, viewed along arrows II, II in FIG. 4.

To prevent potting resin 13 from permeating inside through the outlet formed in projecting electrode 11 of each battery, battery module 10, as shown in the enlarged principal part sectional views of FIGS. 1 and 2, includes first double-sided tape 4 and second double-sided tape 5 stuck on both respective surfaces of each outer peripheral cover 21 and sealing label 6 that is stuck on a surface of each lead plate 3 so as to close connection recesses 32. First double-sided tape 4, second double-sided tape 5, and sealing label 6 are used to prevent potting resin 13 that has not been cured from permeating inside through the outlet formed in each projecting electrode 11 and thus are stuck on only a surface area adjacent to projecting electrodes 11 of batteries 1.

(First Double-Sided Tape 4)

A piece of first double-sided tape 4 has a ring shape and provides a tight fit between an outer peripheral part of battery 1, i.e., an outer peripheral part of the sealing plate that is outside projecting electrode 11, and outer peripheral cover 21 of battery holder 2. First double-sided tape 4 ensures that the outer peripheral part of battery 1 fits tightly over outer peripheral cover 21 of battery holder 2 without a gap to prevent potting resin 13 from permeating through any gap between the sealing plate and outer peripheral cover 21. First double-sided tape 4 shown in FIGS. 1 and 2 is shaped into a ring that has an inside diameter substantially equal to an inside diameter of electrode window 24 and an outside diameter substantially equal to or, more precisely, slightly smaller than the outside diameter of battery 1 to provide a tight fit between the sealing plate of battery 1 and outer peripheral cover 21. First double-sided tape 4 is larger than an outside diameter of projecting electrode 11 and is shaped such that a surface of projecting electrode 11 is fully exposed while the first double-sided tape is stuck on the sealing plate. First double-sided tape 4 is tape that includes adhesive layers on both sides, is disposed between the outer peripheral part of battery 1 and outer peripheral cover 21, and presses outer peripheral cover 21 to provide close adhesion.

(Second Double-Sided Tape 5)

A piece of second double-sided tape 5 provides a tight fit between outer peripheral cover 21 of battery holder 2 and planar part 31 of lead plate 3 and ensures that a surface of outer peripheral cover 21 fits tightly over planar part 31 of lead plate 3 to prevent potting resin 13 from permeating through any gap between outer peripheral cover 21 and lead plate 3. An external shape of second double-sided tape 5 is larger than an external shape of first double-sided tape 4. The second double-sided tape covering a large area is put into intimate contact with the surface of outer peripheral cover 21 to securely seal a joint between outer peripheral cover 21 and lead plate 3. Second double-sided tape 5 shown in FIG. 5 has an external shape that is similar to an internal shape of filling room 23 so as to cover an area including opening edges of a plurality of electrode windows 24 opened in outer peripheral cover 21 of battery holder 2. In other words, the external shape of second double-sided tape 5 is made identical to an external shape of lead plate 3 such that a single piece of second double-sided tape 5 can cover overall lead plate 3. Further, second double-sided tape 5 has through-holes 5A that are opened at places facing the plurality of electrode windows 24 opened in the bottom surface of filling room 23. Connection recesses 32 of lead plate 3 are configured to pass through through-holes 5A and be connected to projecting electrodes 11 exposed out of electrode windows 24. An inside diameter of each through-hole 5A opened in second double-sided tape 5 is substantially equal to or, more precisely, slightly larger than the inside diameter of electrode window 24 and is larger than the outside diameter of projecting electrode 11. This is intended to make sure that the exposed surface of projecting electrode 11 is not narrowed when the second double-sided tape is stuck on the outer peripheral cover. Second double-sided tape 5 is also tape that includes adhesive layers on both sides, is disposed between outer peripheral cover 21 and lead plate 3, and presses lead plate 3 to provide close adhesion.

(Sealing Label 6)

Sealing label 6 is tape that potting resin 13 is not allowed to pass through and that has an adhesive layer on one side. Sealing label 6 is put into intimate contact with planar part 31 of lead plate 3 so as to close the openings of connection recesses 32. Sealing label 6 is shaped such that sealing label 6 comes into intimate contact with planar part 31 adjacent to an entire periphery of each connection recess 32 and is put into intimate contact with planar part 31 to prevent potting resin 13 from flowing into connection recesses 32. Sealing label 6 in FIGS. 4 and 5 has an external shape that covers a series of a plurality of connection recesses 32 adjacent to each other so as to cover an area including the plurality of connection recesses 32 connected to projecting electrodes 11 and close the connection recesses. Specifically, the external shape of sealing label 6 shown in the drawings is a zigzag shape that enables the sealing label to close four connection recesses 34 arranged in a zigzag line at a time. Sealing label 6 is stuck on a surface of each lead plate 3 and is put into intimate contact with an entire area contiguous to the plurality of connection recesses 32 adjacent to each other to securely close the openings of connection recesses 32.

Battery module 10 having the configuration described above is assembled through steps described below.

(1) First double-sided tape 4 is stuck onto the outer peripheral part of the sealing plate of each battery 1.

(2) Batteries 1 on which first double-sided tape 4 is stuck are inserted into insertion parts 22 of the divided members of battery holder 2 and the members of battery holder 2 are joined together to put first double-sided tape 4 into intimate contact with inner surfaces of outer peripheral covers 21. In this state, the sealing plates are fit tightly over the inner surfaces of outer peripheral covers 21 to close any gap between the sealing plates and outer peripheral covers 21.

(3) Second double-sided tape 5 is stuck onto a top surface of each outer peripheral cover 21 of battery holder 2 that is outside electrode windows 24, or second double-sided tape 5 is stuck onto an inner surface of each lead plate 3 that is contiguous to the outer peripheries of connection recesses 32.

(4) Lead plate 3 is guided into each filling room 23 in battery holder 2 and second double-sided tape 5 is put into intimate contact with both the inner surfaces of lead plates 3 and the surfaces of outer peripheral covers 21 to close any gap between lead plates 3 and each outer peripheral cover 21. In this state, connection recesses 32 of lead plates 3 are guided into electrode windows 24 in outer peripheral covers 21 to put protrusion faces 33 into contact with the electrodes of batteries 1.

(5) Protrusion faces 33 formed in connection recesses 32 of each lead plate 3 are connected to the electrodes of batteries 1 by spot welding.

(6) Sealing label 6 is stuck onto the surface of each lead plate 3 to close the openings of connection recesses 32 formed in lead plate 3 and prevent potting resin 13 from passing through the openings.

(7) Liquid or pasty potting resin 13 that has not been cured is injected into each filling room 23 and is cured. Cured potting resin 13 is thermally coupled to batteries 1 through lead plates 3 to reduce a rise in the temperature of batteries 1.

INDUSTRIAL APPLICABILITY

A battery module of the present invention is optimally applicable to a battery module having a structure in which an end face of a battery adjacent to a discharge valve is sealed with a potting resin.

The invention claimed is:
1. A battery module comprising:
a plurality of batteries each including an outlet of a discharge valve disposed in a projecting electrode on an end face of each of the plurality of batteries, each discharge valve being configured to open when an internal pressure of a corresponding one of the plurality of batteries rises to a set pressure;
a battery holder arranging the plurality of batteries parallel to each other at fixed positions;
a lead plate connected to the projecting electrode of each of the plurality of batteries that are arranged at the fixed positions by the battery holder, the end face of each of the plurality of batteries being disposed on a same plane; and
a potting resin thermally coupled to the lead plate,
wherein the battery holder includes an outer peripheral cover having an electrode window to expose one of the projecting electrodes and being disposed on a plane facing an outer peripheral edge of the one of the projecting electrodes,
the lead plate includes:
a planar part disposed over a surface of the outer peripheral cover; and
a connection recess disposed in the planar part, the connection recess being guided into the electrode window in the battery holder and protruding toward the one of the projecting electrodes to connect a protrusion face of the connection recess to the one of the projecting electrodes,
a first double-sided tape provides a tight fit between an outer peripheral part of one of the plurality of batteries having the one of the projecting electrodes and the outer peripheral cover of the battery holder to ensure that the outer peripheral part of the one of the plurality of batteries fits tightly over the outer peripheral cover,
a second double-sided tape provides a tight fit between the outer peripheral cover of the battery holder and the planar part of the lead plate to ensure that the outer peripheral cover fits tightly over the planar part of the lead plate, a sealing label is put into intimate contact with the planar part of the lead plate to ensure that the sealing label closes an opening of the connection recess of the lead plate, and the first double-sided tape, the second double-sided tape, and the sealing label constitute a structure that prevents the potting resin from flowing into the outlet disposed in the one of the projecting electrodes of the plurality of batteries.

2. The battery module according to claim 1, wherein each of the plurality of batteries is a cylindrical battery.

3. The battery module according to claim 1, wherein the sealing label has an external shape that covers a series of a plurality of the connection recesses being adjacent to each other and being connected to a plurality of the projecting electrodes.

4. The battery module according to claim 1, wherein the first double-sided tape has a ring shape and has an inside diameter substantially equal to an inside diameter of the electrode window and an outside diameter substantially equal to an outside diameter of each of the plurality of batteries.

5. The battery module according to claim 1, wherein the second double-sided tape has an external shape substantially identical to an external shape of the lead plate, covers an area including a plurality of the electrode windows opened in the battery holder, and includes through-holes that are opened at places facing the respective electrode windows so as to be similar in outline to the plurality of the electrode windows, and the respective through-holes have a plurality of the connection recesses respectively disposed therein.

* * * * *